United States Patent
Maksymkiw et al.

(10) Patent No.: US 7,695,809 B1
(45) Date of Patent: Apr. 13, 2010

(54) METHOD FOR THE PREPARATION OF NON-BLOCKING ADHESIVE COATED ARTICLES AND COLD SEAL BONDED LAMINATES

(75) Inventors: Michael J. Maksymkiw, White Bear Lake, MN (US); Yuduo Zhu, Waterford, NY (US); Michael J. Dochniak, White Bear Lake, MN (US)

(73) Assignee: H. B. Fuller Company, St. Paul, MN (US)

( * ) Notice: Subject to any disclaimer, the term of this patent is extended or adjusted under 35 U.S.C. 154(b) by 2058 days.

(21) Appl. No.: 09/959,255

(22) PCT Filed: Sep. 30, 1999

(86) PCT No.: PCT/US99/22536

§ 371 (c)(1),
(2), (4) Date: Apr. 26, 2002

(87) PCT Pub. No.: WO00/56470

PCT Pub. Date: Sep. 28, 2000

(51) Int. Cl.
B32B 7/12 (2006.01)

(52) U.S. Cl. .................... 428/343; 428/355 R

(58) Field of Classification Search .............. 428/343, 428/355 R
See application file for complete search history.

(56) References Cited

U.S. PATENT DOCUMENTS

| 4,725,506 | A | * | 2/1988 | Nagano | 428/516 |
| 4,977,003 | A | * | 12/1990 | Brown et al. | 428/35.5 |
| 5,616,385 | A | * | 4/1997 | Rothrum et al. | 428/40.1 |

FOREIGN PATENT DOCUMENTS

| JP | 9272851 | 10/1997 |
| SU | 808513 | 2/1981 |
| WO | WO 95/21899 | 8/1995 |
| WO | WO 00/49102 | 8/2000 |

OTHER PUBLICATIONS

Derwent English Abstract of JP 03-193493A.*

* cited by examiner

*Primary Examiner*—Victor S Chang

(57) ABSTRACT

The present invention relates to a method of preparing adhesive coated articles and cold seal bonded laminates therefrom. Specifically, it relates to a method wherein certain polychloroprene based adhesive compositions are used to form adhesive coated substrates that are non-blocking and pressure sealable at ambient temperature. In a preferred embodiment, the invention relates to a method for the preparation of coated substrates and articles that are particularly useful for the manufacture of medical packaging and tamper evident applications.

3 Claims, 3 Drawing Sheets

METHOD FOR THE PREPARATION OF NON-BLOCKING ADHESIVE COATED ARTICLES AND COLD SEAL BONDED LAMINATES

BACKGROUND OF THE INVENTION

The invention is directed to cold sealable adhesive articles. The present invention relates to a method of preparing adhesive coated articles and cold seal bonded laminates therefrom. Specifically, it relates to a method wherein certain polychloroprene based adhesive compositions are used to form adhesive coated substrates that are non-blocking and pressure sealable at ambient temperature. In a preferred embodiment, the invention relates to a method for the preparation of coated substrates and articles that are particularly useful for the manufacture of medical packaging and tamper evident applications.

It is generally known that water-based "cold seal" adhesives can be used to form dry-bond laminates for protective packaging. The terminology "cold seal" refers to a class of adhesives which possess the ability to form bonds to themselves at ambient temperature with pressure, yet are essentially tack free to the touch, allowing coated substrates to be wound upon themselves and stored without adhering to the opposing face of the substrate backing. Adhesives of this type have been employed in a variety of packaging applications including food (i.e. flexible packaging for candy wrappers, chips etc.); medical packaging; self-seal and tamper evident envelopes; banding for paper money, napkins, and clothing; and protective packaging such as fold over "blister" packages for hardware and small parts. Additionally, the cold seal adhesives have found utility as anti-skid coatings and for release-paper free tapes such as tab-less diaper tapes.

Natural latex based products have dominated the cold seal market for quite some time, since uncompounded natural latex exhibits properties amenable to cold seal applications. Natural latex based cold seals have several deficiencies. For example, in medical device packaging, natural latex based cold seals contain proteins that have been identified as skin sensitizers. Additionally, natural latex based cold seals often discolor, e.g., yellow, and oxidized upon aging resulting in undesirable aesthetics and reduced bond strength of the coated substrates and articles.

Furthermore, the adhesion characteristics of natural latex based cold seals are often reduced by irradiation, which is required for the sterilization of packaged medical bandages and devices. It is believed that irradiation causes the natural latex to crosslink, significantly changing the bond properties.

For medical device packaging it is often desirable that the adhesive coated article resist yellowing when subjected to heat. Yellowing is often undesirable because the discoloration can diminish the aesthetics of the packaging.

Several references that disclose water-based synthetic cold seals, and their method of use, are described below:

The Bayer Corporation Division of Fibers, Organics, and Rubber provides product literature describing "Dispercoll C Polychloroprene Laticies—General Information On Properties And Compounding For Adhesive Applications". The polychloroprene latex peel strength, on canvas duck, are evaluated using a room temperature bond method wherein the aqueous polychloroprene latex is coated onto the substrate and air dried. The canvas is then folded onto itself and immediately pressed in platen at 200 psi for 15 seconds.

U.S. Pat. No. 4,889,884 issued to Dust et al., Dec. 26, 1989 claims a cold-seal adhesive composition comprising about 45 to 70% by wt. of a synthetic base polymer and about 30 to about 55% by wt. of a synthetic secondary polymer, wherein the base polymer comprises a synthetic copolymer, a synthetic copolymer, or any mixture thereof characterized in that it possesses a Tg of about −40 to about −60° C. and a Williams plasticity number of about 2.5 to 2.9; and the secondary polymer comprises a styrene-acrylic copolymer, a synthetic styrene-acrylic resin or any mixture thereof, or an admixture of one or more styrene-acrylic copolymers or styrene acrylic resins, or any mixture thereof with one or more synthetic polymer, copolymers, or synthetic resins, characterized in that it possess a Tg of about −35 to about 5° C. and a plasticity number of about 5.0 to about 5.6. At column 2, lines 41-47 it is states that, "Virtually any synthetic polymer meeting these criteria (Tg and Williams plasticity) can be used in the adhesive compositions of this invention, but preferred polymers include acrylic copolymers such as a copolymer comprising 60% (by wt.) butyl acrylate, 30% (by wt.) 2-ethylhexyl acrylate and 105 vinyl acetate; and styrene butadiene rubbers."

Similarly, U.S. Pat. No. 4,902,370 issued Feb. 20, 1990 as a divisional of the '884 claims a method of forming a cold seal bond on a substrate by applying the recited adhesive, drying said emulsion to form a dried film, and subsequently bringing the coated portion of the substrate in contact with each other such that a bond is effected.

U.S. Pat. No. 5,314,944 issued to Chao, May 24, 1994 relates to a pressure sensitive adhesive that is tack-free to the touch, but forms a permanent bond under moderate pressure. The pressure sensitive adhesive contains a tacky adhesive latex, a non-tacky latex or polymer, and an inert filler. The tacky adhesive latex provides the sealing properties, the non-tacky latex or polymer provides blocking resistance and the filler absorbs oil that may adversely affect the sealing properties. The tacky adhesive latex is generally an acrylic type adhesive latex. The non-tacky latex may be an acrylate latex or a styrene-butadiene latex or a non-tacky polymer such as polyvinyl alcohol, starch and cellulose derivatives.

U.S. Pat. No. 5,567,773 issued to McGee et al., Oct. 22, 1996 is directed to an adhesive coating which is pressure sealable to itself and non-blocking to a dissimilar coating comprising a blend of a) a soft polymer having a measured glass transition temperature below room temperature; and b) a hard polymer having a measured glass transition temperature which is higher than the measured glass transition temperature of the soft polymer in a low blocking, pressure sealable coating formable proportion.

U.S. Pat. No. 4,888,395 issued to Min, Dec. 19, 1989 relates to core/shell polymers containing a rubber core and thermoplastic shell acrylate-vinylacetate-acrylic terpolymer having excellent cold seal strength properties. The core/shell polymer contain about 1 to 50% by weight of a rubber core. At Column 3, lines 54-60, this reference states "Typical rubbers which can make up of the core include polyisoprene, polybutene, polychloroprene (neoprene), poly (1,3-butadiene), natural rubber, butadiene/styrene and the like." Hence, this reference is also directed to cold seal compositions containing a blend of polymers.

Additionally, aqueous polychloroprenes have been used as an ingredient in contact adhesives. For example, U.S. Pat. No. 5,476,896 issued to Pereira et al. Dec. 19, 1995 relates to a water-based contact adhesive comprising a carboxylated polychloroprene latex which provides elastomeric properties, a carboxylated poly (vinyl acetate-ethylene) aqueous emulsion which provides toughness to the adhesive, a tackifier resin dispersion, an organic water soluble crosslinking agent for the carboxyl functionality of the polychloroprene and poly(vinyl acetate-ethylene); and optionally an adhesion promoter. The compositions exemplified contain at least 10% rosin ester dispersion.

Contact adhesives differ substantially from cold seal compositions. As exemplified in Pereira et al., contact adhesives generally comprise tackifying resins. Whereas cold seal compositions require a proper balance of properties such that the adhesive will form a bond to itself with pressure yet do not exhibit tendencies to adhere to other substrates once dried, contact adhesives may either be permanently pressure sensitive or unable to form a bond without heat activation once dried. Further, contact adhesive typically refers to an adhesive that is coated on at least one substrate and adheres to itself upon contact and drying, whereas cold seal compositions are coated on both surfaces intended to be bonded and the coated surfaces are not contacted until after the adhesive is completely dried.

SUMMARY

The present invention describes a method for the preparation of adhesive coated substrates that are useful for the manufacture of cold seal bonded laminates. The dried adhesives are preferably substantially free of protein, non-blocking and pressure sealable at ambient temperature making them particularly useful as protective packaging (e.g., medical device packaging). The adhesive coated articles resist blocking upon being supplied as a consolidated article such as roll-good or layered sheets wherein the adhesive coated surface is in contact with the non-adhesive surface of the substrate. The coated substrates are subsequently cold sealable at pressures ranging from about 5 to about 100 psi (7 kg/cm$^2$), to provide dry-bond laminates.

Specifically, the method includes the steps of:
a) providing an aqueous composition comprising a polychloroprene polymer present in an amount ranging from about 60% by weight to about 99.8% by weight;
b) coating said composition onto a first surface of a substrate to form a wet-coated substrate;
c) drying the wet-coated surface to form a dried adhesive coated substrate wherein said dried adhesive coated substrate is sealable to itself at ambient temperature at a pressure ranging from 5 to 100 psi; and
d) contacting the adhesive coated side with a non-adhesive coated surface at ambient room temperature to form a consolidated adhesive coated article.

Surprisingly, the consolidated article described above is non-blocking. The adhesive coated surface can be easily separated from the non-adhesive coated surface, exhibiting a peel strength of less than about 20-grams per linear inch. It is surmised that the unique non-blocking properties can be attributed to the intermediate crystallinity and gel content of the polychloroprene polymer employed.

The present invention further discloses a method for the preparation of cold seal bonded laminates, the method includes the steps of:
a) providing an adhesive coated substrate that is non-blocking wherein the dried adhesive comprises at least one polychloroprene in a range of from about 60% by weight to about 99.8% by weight;
b) contacting the adhesive coated substrate with a second adhesive coated substrate at ambient room temperature; and
c) applying a pressure of less than about 100 psi (7-kilograms per square centimeter) to form a bond.

In a preferred embodiment, the present invention relates, to laminates, articles, and a method of forming a cold sealable bond employing two different cold seal compositions. The second cold seal compositions exhibits a greater affinity to the first cold seal composition then to the substrate to which the second cold seal composition was coated on. Hence, upon separating the cold seal bond the second cold seal composition adhesively fails along the substrate interface and adheres to the first cold seal composition. This method is particularly useful for non-resealable, tamper-evident, laminate or package.

In one aspect, the invention features an article that includes a substrate that includes bleached medical grade paper, and a cold seal adhesive composition disposed on the substrate, wherein the adhesive composition includes polychloroprene In one embodiment, the cold seal adhesive composition is capable of bonding to itself upon application of a pressure of from 5 psi to no greater than 100 psi. In some embodiments, the cold seal adhesive composition exhibits a peel strength of from about 50 g/linear in to 800 g/linear in. In other embodiments, the cold seal adhesive composition exhibits a peel strength of from about 300 g/linear in to about 410 g/linear in. In another embodiment, the adhesive composition is essentially free of a tackifying agent.

In other embodiments, the substrate bas a density of no greater than 0.05 kg/m$^2$. In one embodiment, the substrate has a density of from about 0.01 kg/m$^2$ to about 0.025 kg/m$^2$. In another embodiment, the substrate has a density of from about 0.01 kg/m$^2$ to about 0.012 kg/m$^2$.

In another embodiment, the adhesive composition is disposed on a first surface of the substrate and in contact with a second surface of the substrate. In one embodiment, the above-described article is wound upon itself in the form of a roll. In some embodiments, the roll exhibits a blocking peel strength of no greater than 20 g/linear in. In other embodiments, the roll exhibits a blocking peel strength of no greater than 10 g/linear in.

In one embodiment, the article further includes a second substrate and a second cold seal adhesive composition disposed on the second substrate such that the second cold seal adhesive composition contacts the first cold seal adhesive composition.

In other embodiments, the composition exhibits a yellow index of no greater than about 20 after aging for 28 days at room temperature, preferably no greater than about 6 after aging for 14 days at room temperature.

In another embodiment, the polychloroprene has no greater than 2.0% crystallinity In some embodiments, the article further includes a second adhesive composition disposed on the substrate such that when the first adhesive composition is in contact with the second adhesive composition, the second composition exhibits greater adhesion to the first adhesive composition than to the substrate.

In other embodiments, the article further includes a second substrate and a second adhesive composition disposed on the second substrate and in contact with the first adhesive composition such that when a force is exerted upon the article to separate the first substrate from the second substrate, the second adhesive composition exhibits adhesive failure at the second substrate.

In some embodiments, the adhesive composition is disposed on the substrate at a coating weight of no greater than about 3 g/m$^2$, preferably from about 0.5 g/m$^2$ to 2.5 g/m$^2$, more preferably from about 1 g/m$^2$ to about 1.5 g/m$^2$.

In another aspect, the invention features a method for preparing an article that includes: a) contacting a substrate that includes bleached medical grade paper with an aqueous composition that includes polychloroprene; and b) drying the aqueous composition to form a cold seal adhesive composition. In one embodiment, the method further includes a) contacting the cold seal adhesive composition with a second cold seal adhesive composition that includes a polychloroprene, the second cold seal adhesive being disposed on a substrate; and b) applying a pressure of less than about 100 psi such that the first cold seal adhesive composition adheres to the second cold seal adhesive composition.

The cold seal adhesive composition is particularly well suited for use in medical packaging where cellulosic substrates are often used. Articles that include the cold seal adhesive composition, e.g., dry bond laminates formed by the method of the present invention, are capable of being opened without tearing the substrate, e.g., medical grade paper, of the packaging. As a result the release of tiny fibers that often occurs when packaging is torn can be minimized. Fiber tear is often undesirable in medical environments because it can produce materials and particles that act as air-borne contaminants. Dry bond laminates also show minimal fiber tear upon forced delamination. Unexpectedly, the dry-bond laminates have shown minimal cellulosic fiber tear upon forced delamination.

The articles can also include two differently formulated cold seal composition adhered to each other and to two substrates, where one of the compositions exhibits a greater affinity for the other cold seal adhesive composition than to the substrate. When such a package is opened, i.e., two substrates are separated, one of the cold seal adhesive compositions adhesively fails at the substrate adhesive interface and adheres to the first cold seal composition.

The cold seal compositions are particularly useful for non-resealable, tamper-evident laminates and packaging.

The cold seal adhesive compositions are also substantially free from the yellowing that can occur in adhesives over time.

Additional features and advantages of the invention will be apparent from the description of the preferred embodiment thereof and from the claims.

DETAILED DESCRIPTION

Figure 1:
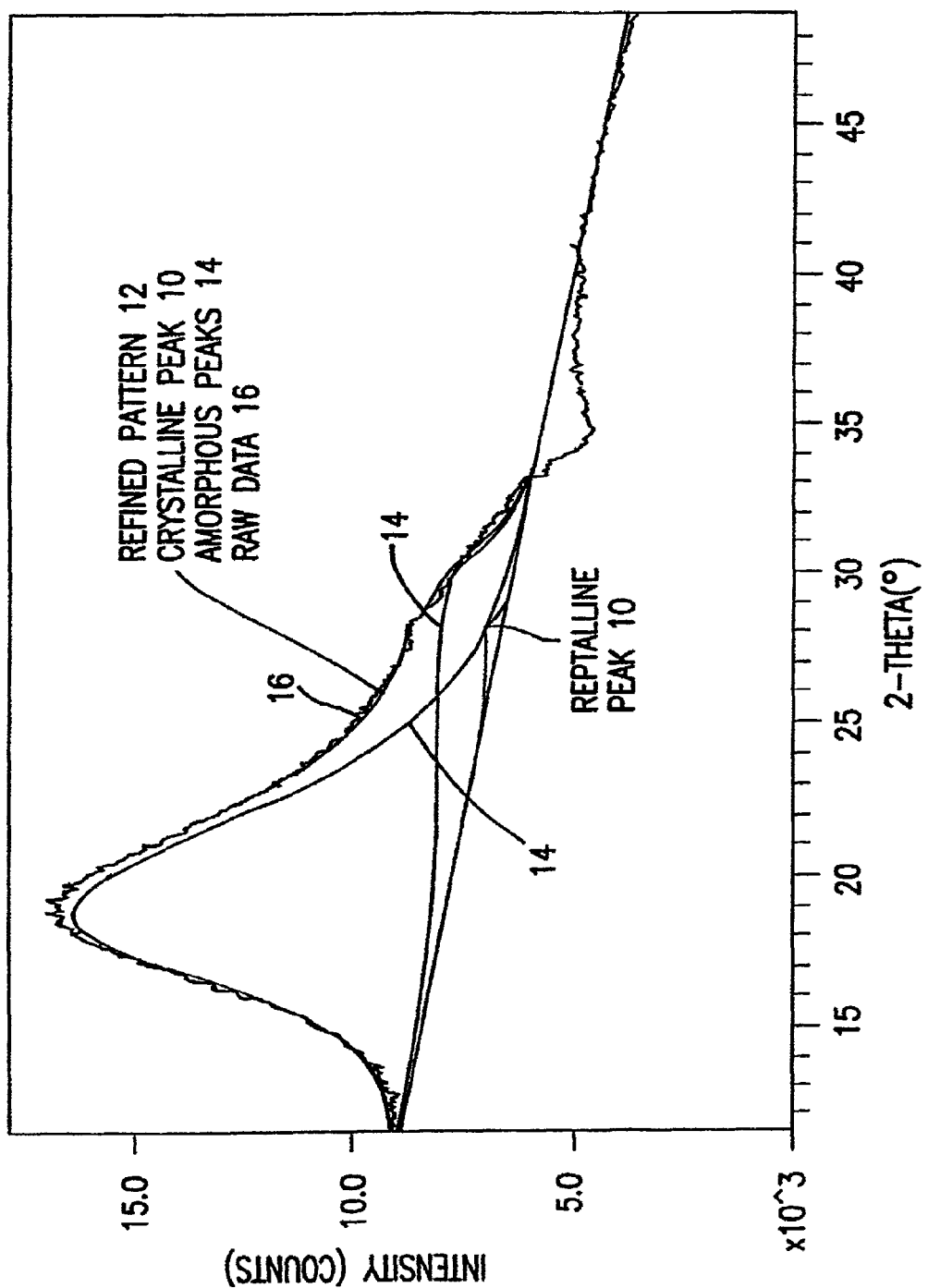
FIG. 1 depicts a plot of Intensity vs. 2-Theta (°) of the crystallinity of AQS 2540 polychloroprene.

The cold seal adhesive composition is a waterbased composition that, after drying, is substantially tack free to the touch, yet adheres to itself at ambient temperature and under pressure. Preferably the cold seal adhesive composition will adhere to itself under 100 psi of pressure. The blocking peel strength of the cold seal adhesive composition may vary depending on the coating weight, pressure applied and dwell time employed. The cold seal adhesive composition preferably exhibits a blocking peel strength of no greater than about 100 g/linear inch, preferably no greater than about 50 g/linear inch, more preferably no greater than about 20 g/linear inch, most preferably no greater than 10 g/linear inch, when measured according to the Blocking Peel Strength Test Method.

The cold seal adhesive composition can be formulated to exhibit a range of peel strengths to a variety of substrates. The substrate and bonding conditions affect the peel strength. The average peel strength can range from about 50 to about 800 g/linear inch (about 100 to about 1000 g/linear cm) when measured according to the Peel Strength Test Method. For several applications, the peel strength preferably ranges form about 200 to about 600 g/linear inch (about 500 to about 1500 g/linear cm), more preferably from about 300 to 410 g/linear inch when measured according to the Peel Strength Test Method.

The cold seal adhesive composition is preferably substantially free from yellowing during the useful life of the article to which it is adhered. Preferably the cold seal adhesive composition exhibits a yellow index (i.e., a degree of yellowing) of less than about 20, preferably no greater than about 10, more preferably no greater than about 6 after 14 days at room temperature and 50% relative humidity. More preferably the cold seal adhesive composition exhibits a yellow index of no greater than 6 after 28 days at room temperature and 50% relative humidity.

Preferably the cold seal adhesive composition maintains its cold seal adhesive characteristics after being subjected to a sterilization process including, e.g., an ethylene oxide, gamma radiation and combinations thereof.

The aqueous compositions used in the invention comprise at least one aqueous polychloroprene dispersion. The dispersion is present in a range from about 60% by weight to about 99.8% by weight, preferably from about 80% by weight to about 99.8% by weight, and most preferably from about 85% by weight to about 95% by weight, based on the total weight. At concentrations less than about 60% by weight the adhesive coated substrates (dried) have reduced cold seal properties. Additionally, the bond strength of the dry-bond laminates is often diminished and more readily delaminate when exposed to increased environmental temperature and stress. Furthermore, reduced levels of polychloroprene often require increased pressure and dwell times to form adequate bonds making the dry-bond laminating process less efficient.

The polychloroprene dispersion can be produced using a variety of methods including, e.g., emulsion polymerization of chloroprene monomer. The properties of the resulting polychloroprene dispersion are determined by the emulsification system used, e.g., the temperature of the polymerization and the extent of conversion. Suitable polychloroprene dispersions are available under the trade designation Dispercoll C including, e.g., Dispercoll C-74, C-84, C-345 and C-370 from Bayer (Akron, Ohio), and under the trade designation Aquastick including, e.g., AQS-1120, AQS-2161, AQS-2540 and AQS-2900, from DuPont Dow Elastomers (Wilmington, Del.). The polychloroprene dispersion/latex can be anionic, non-ionic and in rare instances cationic in character. In the case of anionic latexes the polymer particle will carry a negative charge and be very sensitive to addition of positively charged particle, e.g., metal ions, which will neutralize the charge and cause destabilization. Polychloroprene latexes are typically available as alkaline based dispersions having a pH greater than 8, typically about 12. Commercially available dispersions have a relatively low viscosity, ranging from about 30 to about 500 cPs, and have a solids content of from about 45 to about 60% by weight.

According to the supplier brochures, the polychloroprenes dispersions are reported to have the following properties:

TABLE I

AquaStik ™ Latexes

|  | AQS-1120 | AQS-2161 | AQS-2540 | AQS-2900 |
|---|---|---|---|---|
| Solids content, % | 47 | 59 | 59 | 59 |
| Principal applications | Adhesives | Adhesives | Adhesives | Adhesives |
| Physical Characteristics |  |  |  |  |
| Initial pH | 7 | 12.5 | 12.5 | 12 |
| Specific gravity |  |  |  |  |
| Latex | 1.09 | 1.12 | 1.12 | 1.11 |
| Polymer | 1.24 | 1.25 | 1.25 | 1.23 |
| Brookfield | 500/350 | 27.5 | 30 | >200 |
| Viscosity, cPs |  |  |  |  |
| Polymer type | Low gel | High gel | Medium gel | Sol |
| Crystallization rate | Very slow | Slow | Medium | Very fast |

TABLE 2

Dispercoll ™ Latexes

| Dispercoll | C-74 | C-84 | C-345 | C-370 |
|---|---|---|---|---|
| Solid Content (%) | 58 | 55 | 55 | 58 |
| Viscosity (cps) | 150 | 120 | 80 | 80 |
| PH | 12.5 | 12.5 | 12.0 | 12.0 |
| Average particle size (nm) | 160 | 160 | 170 | 188 |
| Crystallization | Slight to medium | High | Medium | Medium |
| Particle charge | Anionic/nonionic | Anionic/nonionic | Anionic | Anionic |
| Tensile strength (pli) | 585 | 2900 | 300 | 950 |
| Elongation at beak (%) | 1000 | 800 | 1000 | 1000 |
| 100% Modulus | 80 | 467 | 65 | 75 |
| 300% Modulus | 80 | 533 | 65 | 114 |

Useful polychloroprene has a degree of crystallization sufficiently low to enable the resulting cold seal adhesive composition to form a good seal at ambient temperature, yet sufficiently high such that articles prepared from the resulting adhesive composition are essentially free from delamination and blocking when exposed to heat during storage. Preferred polychloroprene has no greater than slight crystallinity. Preferably the polychloroprene has less than 25% by weight crystallinity, more preferably no greater than 5% by weight, most preferably no greater than 2% crystallinity, even more preferably no measurable crystallinity, when measured using wide angle x-ray scattering according to the Crystallinity Test Method set forth in the Examples below.

The polychloroprene also exhibits a gel content of from 0 to about 100%, preferably from about 20% by weight to 60% by weight as reported by the DuPont Product Literature.

The adhesive composition can also include a blend of polychloroprene polymers where the blend is formulated to exhibit desired properties including, e.g., degree of crystallinity and gel content. For example, polychloroprene with a higher crystallinity can be compounded with polychloroprene having a lower crystallinity. Preferably the composition is free from sensitizing protein such as natural latex.

For polychloroprene having crystallinity beyond the desired range, additional softening or hardening ingredients can be added to the adhesive composition at concentrations up to about 30% by weight, preferably from about 10% by weight to about 20% by weight. Examples of useful modifying ingredients include a variety of synthetic polymers and plasticizers. Other synthetic polymers that may be usefully employed include aqueous acrylic dispersions, polyurethane dispersions, and water dispersible polyamides. The mod ingredients may be present in the adhesive composition in the range of from about 1% by weight to about 15% by weight based upon the total weight of the composition.

The present invention advantageously provides an aqueous composition that need not be compounded with the exception of stabilizing ingredients such as antioxidants and zinc oxide. Such a composition is particularly useful in medical device packaging wherein fewer ingredients reduce the potential of leachable contaminants. Additionally, it has been discovered that the polychloroprene based adhesives used in the present invention are amenable to ethylene oxide sterilization process. Natural latex based adhesives are often sensitive to the ethylene oxide sterilization process and may form dry-bond laminates having inconsistent bond strength.

Optionally, the cold seal adhesive composition can include a high softening point aromatic tackifying resin. Preferably tackifier is present in the composition in an amount no greater than about 35% by weight, more preferably no greater than 10% by weight, most preferably no greater than 5% by weight based on the total weight of the aqueous adhesive composition. The resin can be added to the adhesive composition in any useful form including liquid, e.g., aqueous compositions, a resin predispersed in a solvent, or solid, e.g., resin ground to an appropriate particle size for addition to the adhesive composition. Preferred cold seal adhesive compositions of the present invention are free of ingredients that increase the peel adhesion to the non-adhesive coated surface of the substrate. In some instances, waxes may be added to reduce the tack and hence, improve the non-blocking characteristics.

Resins having a melting point higher than 100° C. are increasingly difficult to emulsify, such resins may need to be predispersed in a solvent or ground to an appropriate particle size to be added to the cold seal adhesive composition.

With the exception of the high softening point resins, the additional ingredients are typically available in an aqueous form. However, some ingredients may be sufficiently hydrophilic such that a solid may be directly added to the dispersion.

The adhesive composition also includes at least one antioxidant. Antioxidants inhibit oxidation that often reduces the polychloroprenes chain length resulting in a softer, weaker polymer. Useful antioxidants include, e.g., Tinuvin 292 titanium dioxide available from Ciba Additives (Tarrytown, N.J.), and phosphite stabilizers including, e.g., Polygard available from Uniroyal Chemical Company (Middlebury, Conn.). One preferred antioxidant is Aquamix 125, which is an aqueous mixture that includes 4-methyl-phenol and its reaction product with dicyclopentadiene and isobutylene; and the sodium salt of polymerized alkylnaphthalene sulfonic acids available from Harwick Chemical Corporation (Cuyahoga, Ohio). The antioxidant is present in the aqueous composition in an amount sufficient to inhibit discoloration and to maintain the polymer integrity. Preferably the aqueous adhesive composition includes antioxidant in an amount of from about 0.1% by weight to about 15.0% by weight, preferably from about 0.5% by weight to about 12.0% by weight. In some embodiments, the aqueous adhesive composition includes from about 0.5% by weight to about 5.0% by weight, preferably from about 0.5% by weight to about 2.0% by weight, more preferably from about 0.5% by weight to about 1.5% by weight.

The cold seal composition can also include additives to modify the consistency of the polychloroprene polymer dispersion including, e.g., viscosity and rheology, and to improve the shelf life and aging characteristics of the composition. Commonly employed additives include stabilizers, antioxidants, thickeners, defoamer, fillers, antimicrobial agents and neutralizers.

At least one neutralizer or acid scavenger such as magnesium oxide, zinc oxide, and combinations thereof, can be added to the aqueous composition of the present invention. The preferred acid scavenger is zinc oxide. The acid scavenger serves as a stabilizer by neutralizing the amounts of hydrogen chloride that cleave off the polymer as it ages. Elevated temperatures can also cause the evolution of hydrogen chloride and destabilization of the aqueous composition. The acid scavenger is preferably present in an amount such that polymer degradation is minimized, and blocking characteristics and dry bond laminate peel strength are optimized. Acid scavengers are generally present in amounts ranging from about 0.1 to about 5% by weight, preferably from about 0.5 to about 2.0% by weight, most preferably from about 0.5 to about 1.5% by weight. An acid scavenger concentration less than about 0.1% by weight may be undesirable in that polymer degradation often occur. Polymer degradation decreases the molecular weight of the polychloroprene polymer increasing the blocking characteristics of the adhesive coated substrate and reducing the dry-bond laminates peel strength. Alternatively, an acid scavenger concentration greater than about 2% by weight may be undesirable in that the adhesive coated substrates (dry) cold seal properties may be diminished resulting in reduced dry-bond laminate peel strength.

Thickeners can also be added to the aqueous composition. Thickeners help prevent excessive sedimentation of the compounding ingredients, as well as excessive penetration of the composition into porous substrates. Thickener can also be added to prevent the aqueous adhesive composition from running on horizontal surfaces and sagging when applied to vertical surfaces. Thickeners can also aid in applying the proper film thickness to avoid inconsistent bonding performance.

The adhesive composition can also include fillers. Fillers can increase the total solids content, improve the water or solvent resistance and reduce tack such that the cold seal composition exhibits a predetermined peel strength. Suitable inorganic fillers include clay, calcium carbonate, hydrated aluminum, aluminum silicate, feldspar, diatomaceous earth, hydrated silicates, mica, barytes, lithopone, and mixtures thereof. Filler is present in the composition in an amount sufficient to inhibit cohesive failure and fiber tear in an article that includes the cold seal composition and to maintain a desired peel strength. Particularly in embodiments wherein two different cold seal compositions are employed, the second composition exhibiting a greater affinity to the first composition than to the substrate on which it was coated, it is preferred that the second composition comprises a filler at concentrations ranging from about 0% to about 25% by weight, more preferably from about 0 to about 10% by weight, most preferably from about 4% by weight to about 8% by weight based on the total weight of the aqueous composition.

Useful fillers have a particle size of from about 0.1 microns to about 40 microns, preferably from about 0.1 to about 10 microns, more preferably from about 0.1 to about 5 microns, and most preferably from about 0.1 to about 0.5 microns. A filler average particle size distribution greater than about 40 microns may be undesirable to the cold seal adhesive in that particle suspension aids are often required to reduce sedimentation and such materials often decrease peel performance. A filler average particle size distribution less than about 0.1 microns is often undesirable in that these materials can dust, which can present an inhalation hazard.

| Concentration of the Ingredients (wt-% aqueous) | | | |
|---|---|---|---|
| | Useful | Preferred | Most Preferred |
| Polychloroprene Latex | 60-99.8 | 80-99.8 | 85-95 |
| Additives | | | |
| Filler | 0-25 | 0-10 | 4-8 |
| Antioxidant | 0.1-15 | 0.5-12 | 0.5-1.5 |
| Neutralizer | 0.1-5 | 0.5-2 | 0.5-1.5 |
| Defoamer | 0.1-5 | 0.1-0.5 | 0.1-0.3 |
| Polychloroprene Latex | 60-99.8 | 85-99.8 | 90-99.8 |
| Additives | 0-35 | 0-15 | 0-10 |

The aqueous cold seal dispersions of the present invention are prepared in accordance with known mixing procedures. The ingredients are generally added to the mixer in the order of addition from the ingredient present at the greatest concentration to the ingredient present in the smallest amount. Thus, the polychloroprene latex is usually added first. For embodiments wherein the polychloroprene does not possess the preferred intermediate crystallization rate, the softening and/or hardening modifying ingredients are then slowly added with agitation, followed by the various additives. Materials which add stability and compatibility during the mixing process such as defoamers may be added at other times.

The viscosity of the aqueous compositions of the present invention can be adjusted. The aqueous cold seal adhesive composition preferably exhibits a viscosity of from about 50 to 2000 cPs, preferably less than 1000 cPs, more preferably from about 100 to about 500 cPs for most applications. The aqueous adhesive composition is applied to at least one side of the substrate and dried forming a dry-coated substrate. Standard coating techniques are utilized including an air knife coater, kiss roll coater, meter bar coater, gravure roller coater, reverse roll coater, dip coater or die coater, one or more stations of a central impression (CI) or stack type flexographic printing press or combinations thereof. Additionally, the aqueous composition may be applied by brushing or spraying. The coatings may be continuous or discontinuous.

The aqueous adhesive composition can be formulated such that it is capable of application to a substrate at a rate of about 20 ft/min to about 700 ft/min, more preferably from about 300 ft/min to about 600 ft/min, more preferably about 500 ft/min.

The aqueous adhesive composition can be coated on a wide variety of substrates including, e.g., treated and untreated plastic film. Examples of useful substrates include paper, nylon biaxially oriented nylon, metallocene polyolefin based materials, polyester including, e.g., polyethylene terephthalate (PET), copolyester copolymers of terephthalic acid, TYVEK® from DuPont, ethylene glycol and cyclohexane dimethanol (PETG) from Eastman Chemical, metallized PET, polycarbonate films, polyvinyl chloride (PVC), polyvinylidiene chloride (PVDC), polystyrene (PS), high impact polystyrene (HIPS) from Dow Corning, Barex™ heat resistant acrylonitrile from Goodrich, XT polymer, PRIMACOR™ ethylene acrylic acid copolymer from Dow Chemical, polyethylene including, e.g., low density polyethylene (LDPE), linear low density polyethylene (LLDPE), and high density polyethylene (HDPE), ethylene-vinyl-acetate, cellophane, foil(s) including, e.g., aluminum, wood and acrylonitrile butadiene styrene.

Preferred substrates include bleached medical grade paper having a density of about 8 lbs/ream (0.004 kg/m$^2$) to about 100 lbs/ream (0.05 kg/m$^2$), preferably from about 20 lbs/ream (0.01 kg/m2) to about 50 lbs/ream (0.025 kg/m$^2$), and most preferably from about 20 lbs/ream to about 25 lbs/ream (0.012 kg/m$^2$). A density less than about 8 lbs/ream can be undesirable to the adhesive coated roll stock in that increased blocking often occurs making it difficult to unwind. Alternatively, a density greater than about 100-lbs/ream may be undesirable in that these substrates are often rigid and less useful for the manufacture of flexible dry-bond laminates.

The substrates can be of any thickness. Preferably the substrates are of a thickness suitable for processing with high speed coating equipment. Preferably the substrates are of a thickness of from about 0.5 mils to about 10.0 mils. Paper substrates preferably have a thickness of from about 0.5 mils to about 4.0 mils.

In some applications, the coated substrate is adhered to itself such that the cold seal composition is bonding two layers of the same substrate to each other. However, in other applications the coated substrate surface is bonded to a different substrate. The opposing surface of the substrate (i.e., the surface opposite the side of the substrate that is coated with the cold seal adhesive composition) is preferably coated with a release coating. Suitable release coatings include certain acrylic dispersion and water dispersible polyamides as well as silicone-based and perfluorinated based polymer dispersions. These release coatings are used to reduce blocking.

The wet-coated substrates are then dried, e.g., at ambient room temperature or with heated air, infrared radiation or the like using, e.g., an archer dryer, straight bath dryer, lower dryer, drum dryer, and combinations thereof. The wet-coated substrate can be dried at a temperature in a range from about 20° F. (1° C.) to about 200° F. (93° C.), preferably from about 140° F. (60° C.) to about 160° F. (70° C.) for a period of about 2-seconds to about 8-seconds, preferably from about 3-seconds to about 6-seconds.

Useful (dried) coat weights include from about 0.01 g/m$^2$ (0.02 lbs/ream) to about 3 g/m$^2$ (6 lbs/ream), preferably from about 0.5 g/m$^2$ (1 lbs/ream) to 2.5 g/m$^2$ (5 lbs/ream), most preferably from about 1 g/m$^2$ (2 lbs/ream) to about 1.5 g/m$^2$ (3 lbs/ream). For some applications, for example when the cold seal is applied to an uneven substrate, a higher coating thickness may be useful.

The dried adhesive composition may be adhered to itself at ambient temperature (20° C. to 30° C.) and at pressures ranging from about 5 to 100 psi (0.3 to 7 kg/cm$^2$), preferably from about 5 to 60 psi (0.4 to 4.2 kg/cm$^2$), more preferably from about 5 to 40 psi (0.4 to 2.8 kg/cm$^2$). The peel strength of the adhesive composition is dependent on dry-coat weight, pressure and dwell time. In general, as these three variables increase, peel strength increases.

If desired, the wet coating, drying, and subsequent cold seal bonding by applying pressure may be done in-line as a continuous process. Preferably, the wet coated substrate is dried using forced air and heat to reduce the drying time, wound upon itself in the form of a roll, and stored for a period of time prior to bonding. Surprisingly, the applicants have found that after drying, the cold seal composition of the present invention may be bonded underwater.

In a preferred method, at least two substrates are coated with dissimilar aqueous compositions and dried to form dissimilar cold seal adhesive coated substrates. The first cold seal adhesive composition is then contacted with the second cold seal adhesive composition to form a laminate. Preferably, the second dried cold seal adhesive composition exhibits a greater affinity to the first dried cold seal adhesive composition than to the substrate on which the second composition is coated. The laminate predominantly exhibits adhesive failure at one of the substrates. Such laminates are useful in tamper evident articles. For example, an aqueous composition that includes at least one aqueous polychloroprene, at least one antioxidant, and at least one acid scavenger is coated on a first substrate to form a first wet-coated substrate. The first wet-coated substrate is then dried at ambient room temperature or with forced air and heat to form a first dry-coated substrate. A second aqueous composition comprising at least one aqueous polychloroprene, at least one antioxidant, at least one acid scavenger, and at least one inorganic filler is then coated on a second substrate to form a second wet-coated substrate. The second wet-coated substrate is also dried at ambient room temperature or with forced air and heat to form a second dry-coated substrate. The dissimilar dry-coated substrates may then be consolidated, for example contacted with each other in the form of a tape roll stock or layered sheets, wherein the dry-coated side of one substrate is in contact with the non-coated side of the second substrate. During the cold seal process, the first dry-coated substrate and the second dry-coated substrate are unwound or separated such that the adhesive coated sides of the substrates are no longer in contact with the non-coated sides of the substrates.

Surprisingly, it has been discovered that dry-bond laminates having dissimilar dried compositions can be designed to fail in an adhesive mode (i.e., at an adhesive substrate interface). Adhesive failure is advantageous in many applications in that it allows tamper evident features wherein the adhesive failure predominates at one of the adhesive-substrate interfaces making it difficult to adhere the adhesive to the substrate (e.g., reseal a package). Additionally, in medical packaging applications in which the substrate is a form of paper, adhesive failure can reduce fiber tear. Fiber tear can emit small fibers into the medical environment causing contamination.

The substrates coated with the cold seal adhesive composition are useful in a variety of applications including, e.g., food packaging, e.g., confectionaries such as candy bars; medical and pharmaceutical packaging, e.g., bandages, dressings and fabric seals on elasticized cloth bandages; self-seal, peelable, tamper evident envelopes, security packaging for lottery tickets; banding for paper money, napkins, tableware, clothing; bundling tapes and interveinous tubing; protective packaging, e.g., fold over "blister" packages for hardware and small parts; for sealing various cartons including, e.g., folding cartons, corrugated box assembly, bags and other containers; luggage tags; poultry wraps; industrial wraps, e.g., wraps for machine parts which typically employ low pressure Kraft paper; and protective overlays for auto body parts, plexiglass, and polycarbonate. Additionally, cold seal adhesives have found utility as anti-skid coatings and for release-paper free tapes such as tab-less diaper tapes.

Preferred applications of the cold seal adhesive composition include medical packaging and processes that include sterilization procedures, e.g., gamma radiation, ethylene oxide, and combinations thereof. Examples of such medical packaging include, bleached medical grade paper packages including a sealable opening, e.g., envelopes, bags, pouches, packages for sealing sterilized articles used in the medical industry including and packages that undergo sterilization after receiving an article.

The invention is further illustrated by the following non-limiting examples.

EXAMPLES

Test Procedures

Test procedures used in the examples include the following.

Brookfield Viscosity

The viscosity of a sample is determined using a #2 spindle at 20-rpm and 25° C.

Blocking Peel Strength Test 2.54-cm×15.24-cm strips of 1.8 kg/279 m² bleached medical grade paper E.B. Eddy Forrest Products LTD (Espanola, Ontario) are coated with adhesive composition at a dried coat weight of 1.36 kg/279 m². The coated side of the paper is then contacted with the non-coated side of the paper at ambient temperature and wound into a roll. A 1 in×1 in×1 in sample is cut into the roll, removed from the roll and discarded. A second sample that includes layers of cold seal adhesive coated substrates is then cut into the roll at the point exposed by the removal of the 1 in×1 in×1 in sample. The second sample is then removed from the roll.

The blocking peel strength of the sample, which is the 180° peel strength of the bond between the adhesive coated surface and the non-adhesive coated surface of the substrate, is measured using a Thwing Albert Friction Peel Tester Model 225 at 30-cm per minute.

Peel Strength Test 2.54-cm×15.24-cm strips of 1.8 kg/279 m² bleached medical grade paper E.B. Eddy Forrest Products LTD (Espanola, Ontario) are coated with adhesive composition at a dried coat weight of 1.36 kg/279 m². The adhesive coated side of a first sample is contacted with the adhesive coated side of a second sample at a pressure of 4.2 kg/cm2 with a dwell time of 0.5-seconds. The 180° peel strength of the bond is evaluated using a Thwing Albert Friction Peel Tester Model 225-1 run at 30-cm. per minute. The average peel strength of the sample is recorded.

Crystallinity Test Method

A sample is placed in a ¼ circle Eularian cradle sample holder of a Bruker microdiffractometer (Bruker AXS, Madison, Wis.) having copper radiation, an incident beam monochromater, 0.8 mm beam collimator and a Bruker GADDS multiwire area detector. The sample to detector distance is 15.0 cm.

A sample film is loaded onto the film sample holder and run in the transmission mode. Two detector frames are collected to cover a range of 6 to 66 degrees two-theta. Each frame is collected for 10 minutes. The step size is 0.04 degrees two theta at a detector distance of 15.0 cm.

The data is analyzed using JADE 5.0 software (Materials Data Inc., Livermore, Calif.). The degree of crystallinity is determined by taking the ratio of the area of the crystalline region to the area of the entire sample. An amorphous "fingerprint" is made with a film that has been quenched in liquid nitrogen. This fingerprint is then used to define the amorphous content of sample films.

Yellow Index Test Method

An adhesive coated sample is placed under a Minolta Chromameter model CR-331 (Minolta Camera Company (Japan)) that has previously been calibrated with a Minolta calibration plate No. 14133194. Measurements of L, a, and b values are obtained. The Yellow Index is then calculated according to the following formula:

$$YI = 70(a) + 175(b)/0.98041(L).$$

Table 3 depicts the tradename, generic description, supplier and supplier location of the ingredients employed in the examples in addition to the polychloroprene polymer dispersion.

TABLE 3

| Ingredient | Generic Description | Supplier (Location) |
|---|---|---|
| Aquamix 125 | Phenol antioxidant | Harwick Chemical (Cuyahoga Falls, OH) |
| ASP 200 | Aluminum silicate filler | Engelhard Corporation (Iselin, NJ) |
| Joncryl 537 | Styrene acrylic polymer | S. C. Johnson Polymer (Sturtevant, WI) |
| Foamaster VF | Defoamer | Henkel Corporation (Kankakee, IL) |
| Zinc Oxide Dispersion - 60% zinc oxide in water | | R. T. Vanderbilt Co. (Norwalk, CT) |

Table 4 depicts the ingredients and physical properties of Examples 1-4. The peel strength of the compositions of Examples 1-4 were tested according to the Peel Strength Test Method. Example 1 is a high solids content composition that forms a flexible coating upon drying that is well suited for elasticized fabric bandage wrap packaging as well as for blister pack. Example 2 is well suited for tamper-proof envelope applications. Example 3 is also well suited for tamper evident packaging as well as for medical fastener tape. Example 4 was specifically targeted for medical dressing applications and is also suitable for blister pack.

TABLE 4

| | Ex. 1 | Ex. 2 | Ex. 3 | Ex. 4 |
|---|---|---|---|---|
| Disprecoll C-74 | 97.8 | 77.9 | 91.3 | 88.8 |
| Joncryl 537 | | | | 9 |
| Foam Blast 382 | 0.2 | 0.2 | | 0.2 |
| Foamaster VF | | | 0.2 | |
| ASP 200 | | 14.1 | 6.0 | |
| Zinc Oxide Dispersion | 1.0 | 1.0 | 1.5 | 1.0 |
| Akrosperse W-19119 | | 1.0 | | 1.0 |
| Aquamix 125 | 1.0 | | 1.0 | |
| Water | | 5.8 | | |
| Solids (%) | 55 | 60 | 60 | 55 |
| PH | 11 | 11 | 11 | 11 |
| Viscosity (cPs) | 100 | 500 | 250 | 200 |
| Wt. Per gallon | 9 | 10 | 10 | 9 |
| Peel Strength | 350 +/− 63 | 332 +/− 59 | 401 +/− 38 | 397 +/− 24 |

Tables 5A and 5B depict the cold seal bond performance (i.e., peel strength) of several preferred aqueous compositions described in the present invention. The compositions of Examples 3 and 2 were coated onto a 22 lb bleached medical grade paper substrate at the coating weights indicated and pressure was applied to the substrate for the period, i.e., dwell time, indicated. The resulting peel strength as measured according to the Peel strength Test Method is reported in Tables 5A and 5B.

TABLE 5A

| | Example 3 | | | | | |
|---|---|---|---|---|---|---|
| Sample No. | 3A | 3B | 3C | 3D | 3E | 3F |
| Coating Wt. (lbs/ream) | 3.1 | 3.1 | 2.1 | 2.1 | 2.4-2.8 | 2.4-2.8 |
| Dwell Time (sec) | 0.5 | 1.0 | 0.5 | 1.0 | 0.5 | 1.0 |
| Applied Pressure | Peel Strength (g/linear in) | | | | | |
| 5 psi | 49 | 35 | — | 39 | — | — |
| 40 psi | 157 | 136 | 60 | 55 | 98 | 79 |

TABLE 5A-continued

| | Example 3 | | | | | |
|---|---|---|---|---|---|---|
| Sample No. | 3A | 3B | 3C | 3D | 3E | 3F |
| 60 psi | 219 | 204 | 40 | 52 | 134 | 111 |
| 80 psi | 199 | 363 | 76 | 54 | 134 | 136 |
| 100 psi | 328 | 407 | 86 | 90 | 164 | 216 |

TABLE 5B

| | Example 2 | | | | | |
|---|---|---|---|---|---|---|
| Sample No. | 2A | 2B | 2C | 2D | 2E | 2F |
| Coating wt. (lbs/ream) | 2.5-3.0 | 2.5-3.0 | 3.0-3.5 | 3.0-3.5 | 3.5-4.0 | 3.5-4.0 |
| Dwell Time (sec) | 0.5 | 1.0 | 0.5 | 1.0 | 0.5 | 1.0 |
| Pressure Applied | Peel Strength (g/linear in) | | | | | |
| 40 psi | 69 | 76 | 110 | 112 | 112 | 106 |
| 60 psi | 130 | 119 | 135 | 156 | 122 | 142 |
| 80 psi | 133 | 137 | 166 | 209 | 211 | 199 |
| 100 psi | 175 | 190 | 195 | 233 | 285 | 278 |

Example 3 was then coated onto 40-pound bleached medical paper and dried in a forced air oven. The dry-coated substrate had a coat weight of 3-pounds per ream. The dry-coated substrate was then consolidated in roll form wherein the dry-coated side was in contact with the non-coated side. The roll stock was then conditioned at 120° F. for 24-hours. After conditioning, multiple layers of 2.54-cm×30.48-cm strips were cut from the roll stock. The strips blocking characteristics (i.e., blocking peel strength) were evaluated using a Thwing Albert Friction Peel Tester Model 225-1 run at 30-cm per minute. The average 180° peel value (i.e., blocking peel strength) was less than 18 g/linear in.

Examples 5-7

Example 5: Aqueous AQS 2540 polychloroprene was poured into a silicone release mold and dried in a convection oven for 7 days at 50 C to form a film having a thickness of 10 mil. The film, when analyzed according to the Crystallinity Test Method, was determined to have 1.3% crystallinity. A plot bf the Intensity vs. 2 Theta (°) for the film of Example 5 is shown in FIG. 1 and includes crystalline peak 10, refined pattern 12, amorphous peaks 14 and raw data 16.

Figure 2:
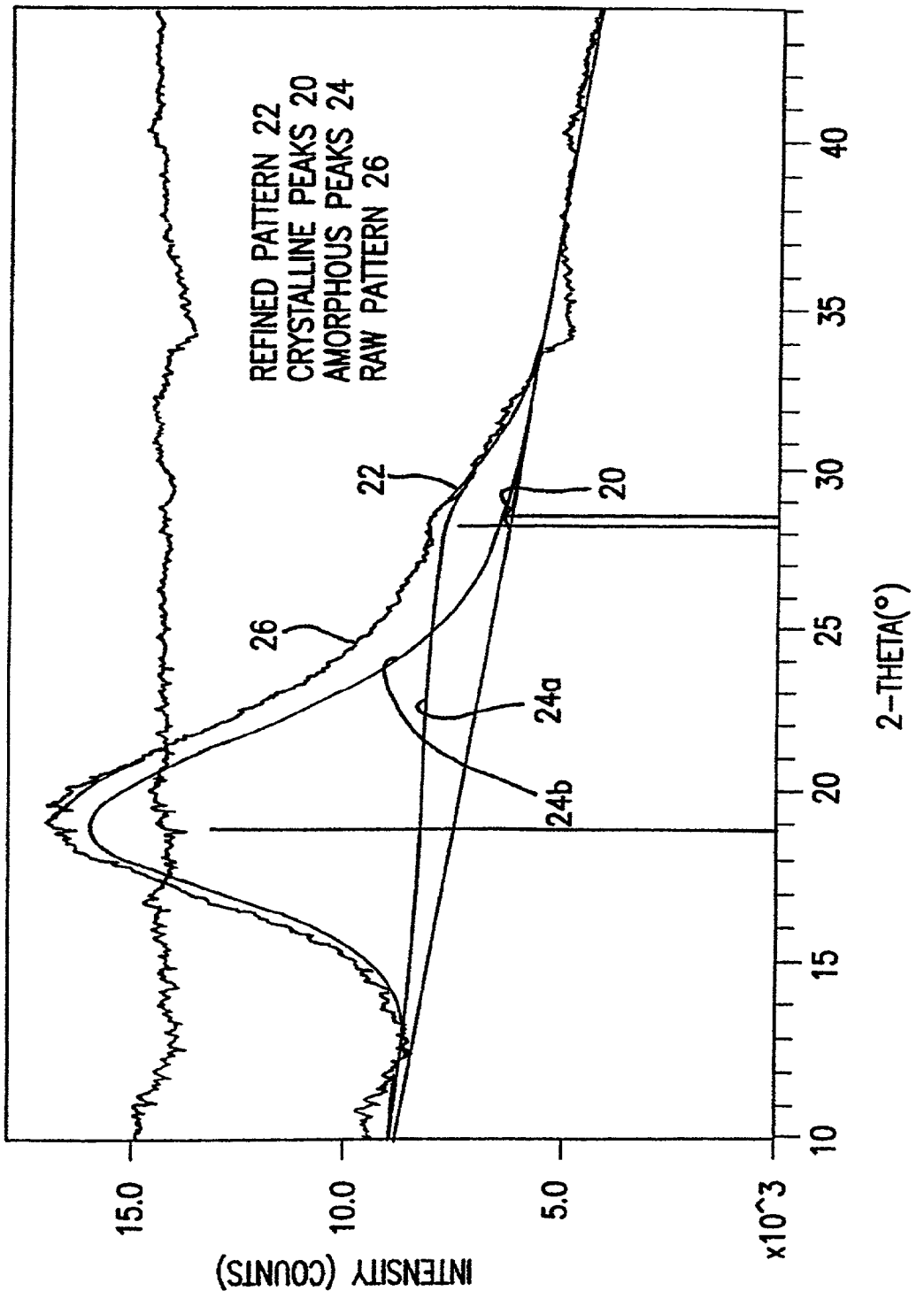
FIG. 2 depicts a plot of Intensity vs. 2-Theta (°) of the crystallinity of Dispercoll™ C-74 polychloroprene.

Example 6: Aqueous Dispercoll™ C-74 polychloroprene was poured into a silicone release mold and dried in a convection oven for 7 days at 50 C to form a film having a thickness of 10 mil. The film, when analyzed according to the Crystallinity Test Method, was determined to have 0.1% crystallinity. A plot of the Intensity vs. 2 Theta (°) for the film of Example 6 is shown in FIG. 2 and includes crystalline peak 20, refined pattern 22, amorphous peaks 24 and raw data 26.

Figure 3:
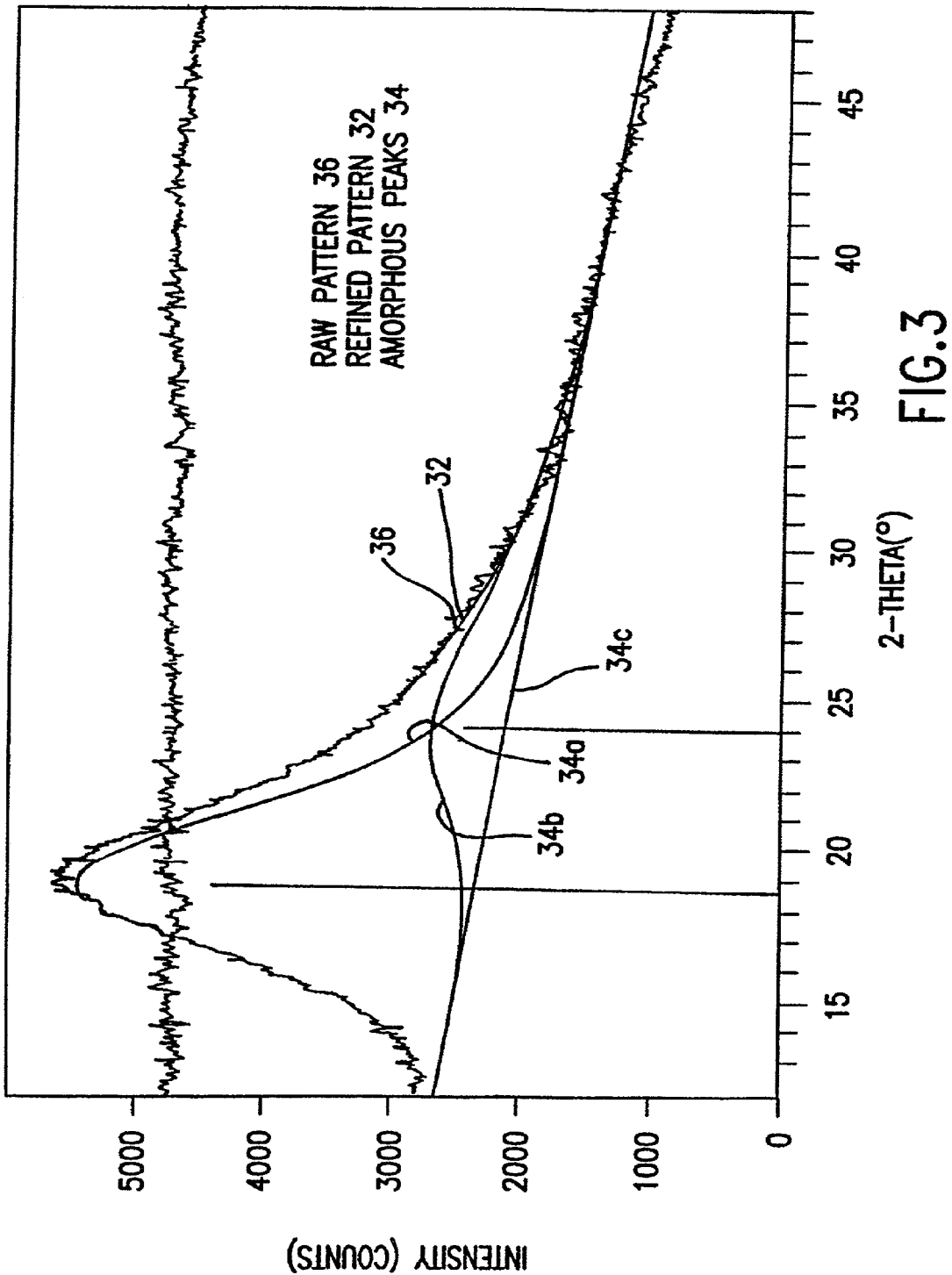
FIG. 3 depicts a plot of Intensity vs. 2-Theta (°) of the crystallinity of Aquastik™ 1120 polychloroprene.

Example 7: Aqueous Aquastik™ 1120 polychloroprene was poured into a silicone release mold and dried in a convection oven for 7 days at 50 C to form a film having a thickness of 10 mil. The film, when analyzed according to the Crystallinity Test Method, was determined to have 0% crystallinity. A plot of the Intensity vs. 2 Theta (°) for the film of Example 7 is shown in FIG. 3 and includes refined pattern 32, amorphous peaks 34 and raw data 36.

Example 8

0.1% by weight Foamaster VF defoamer was added to 91.3% by weight Dispercoll C-74 and mixed. 6% by weight ASP 200, 1.5% by weight of 60% Zinc Oxide dispersion in water, 1% by weight Aquamix 125 and 0.1% by weight Foamaster VF defoamer were then added to the composition and mixed. The composition was then filtered through a 400 micron screen.

The composition of Example 8 was coated onto 21 lb bleached medical grade paper (E.B. Eddy Forrest Products LTD (Espanola, Ontario)) and dried to provide a dry coating weight of 0.6 lbs/ream. The dry-coated substrate was contacted to a second dry coated substrate and crimp sealed with approximately 100 lbs of pressure. The samples were then sterilized with ethylene oxide and placed in a convention oven maintained at 150° F. The samples remained in the oven at 150° F. for 28 days. Samples were removed from the oven at 7, 14, 21 and 28 days.

The samples were subjected to the Peel Strength Test Method, and the Yellow Index Test Method, and observed for bond failure mode and discoloration as viewed by the unaided eye. The results are reported in Table 6.

TABLE 6

| Test Duration | Peel Value (grams) | Observation | Discoloration | Yellow Index |
|---|---|---|---|---|
| 0 | 46.1 | Non-fiber tearing destruct bond | None | 3.11 |
| 7 | 41.6 | Non-fiber tearing destruct bond | None | 3.19 |
| 14 | 52.5 | Non-fiber tearing destruct bond | None | 3.18 |
| 21 | 42.7 | Non-fiber tearing destruct bond | Minimal off-white discoloration | 4.03 |
| 28 | 34.7 | Non-fiber tearing destruct bond | Off-white discoloration | 5.23 |

Example 9

A first adhesive composition prepared as follows. 10% by weight Vulkazone FD antioxidant (Bayer Corporation) was combined with 80% by weight of the composition of Example 3 to provide an aqueous adhesive composition.

A 40 lb bleached medical grade paper was coated with EMULSION EP40 polyethylene wax dispersion (Chemor, Chester, N.Y.) to provide a dried coat weight of 5 lbs/ream.

The first aqueous adhesive composition was then coated onto the wax coated paper to provide a dried adhesive coat weight of 4.4 lbs/ream.

A second adhesive composition was prepared by combining 10% by weight Vulkazone FD antioxidant (Bayer Corporation), 10% by weight Joncryl 537 (S.C. Johnson) and 80% by weight of the composition of Example 4.

The second composition was then coated on a film of high density polyethylene to provide a film having a dried coat weight of 3.2 lbs/ream.

The adhesive coated surface of the 1 in×8 in strips of the first and second samples were then mated together to form a laminate. A 20 lb roller was then passed over the laminate twice to seal the laminate.

The laminate, when tested according to the Peel Strength Test Method, exhibited a peel strength of 126 g/linear in.

A second laminated strip was then then subjected to 30 kilogrey of gamma radiation. When tested according to the Peel Strength Test Method, samples exhibited a peel strength of 183 g/linear in.

Other embodiments are within the claims.

What is claimed:

1. An article comprising:
   a substrate comprising bleached medical grade paper; and
   a cold seal adhesive composition disposed on said substrate, said adhesive composition comprising polychloroprene, said polychloroprene having no greater than 2.0% crystallinity.

2. An article comprising:
   a substrate comprising bleached medical grade paper;
   a first cold seal adhesive composition disposed on said substrate, said first adhesive composition comprising polychloroprene; and
   a second cold seal adhesive composition comprising polychloroprene disposed on said substrate,
   wherein when said first adhesive composition is in contact with said second adhesive composition, said second adhesive composition exhibits greater adhesion to said first adhesive composition than to said substrate.

3. An article comprising:
   a first substrate comprising bleached medical grade paper;
   a cold seal adhesive composition disposed on said first substrate, said adhesive composition comprising polychloroprene;
   a second substrate; and
   a second cold seal adhesive composition comprising polychloroprene disposed on said second substrate and in contact with said first adhesive composition such that when a force is exerted upon said article to separate said first substrate from said second substrate, said second adhesive composition exhibits adhesive failure at said second substrate.

\* \* \* \* \*